US010620771B2

(12) United States Patent
Bingham et al.

(10) Patent No.: US 10,620,771 B2
(45) Date of Patent: *Apr. 14, 2020

(54) METHODS, SYSTEMS, AND MEDIA FOR PRESENTING ANNOTATIONS ACROSS MULTIPLE VIDEOS

(71) Applicant: Google LLC, Mountain View, CA (US)

(72) Inventors: Aaron Dennis Bingham, Zurich (CH); Silviu Bota, Horgen (CH); Raul Evelio Vera, Forest Lodge (AU); Dror Menachem Shimshowitz, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/055,807

(22) Filed: Aug. 6, 2018

(65) Prior Publication Data
US 2018/0348920 A1 Dec. 6, 2018

Related U.S. Application Data

(63) Continuation of application No. 13/839,843, filed on Mar. 15, 2013, now Pat. No. 10,042,505.

(51) Int. Cl.
G06F 3/048 (2013.01)
G06F 3/0481 (2013.01)
G06Q 30/02 (2012.01)
G11B 27/00 (2006.01)
G06F 16/78 (2019.01)

(52) U.S. Cl.
CPC .......... G06F 3/048 (2013.01); G06F 16/7867 (2019.01); G06Q 30/0277 (2013.01); G11B 27/00 (2013.01)

(58) Field of Classification Search
CPC ............... G06F 17/241; G06F 16/48
See application file for complete search history.

(56) References Cited

U.S. PATENT DOCUMENTS

| 6,064,376 A | 5/2000 | Berezowski et al. |
| 8,392,821 B2 | 3/2013 | DeMarco et al. |
| 8,832,741 B1 | 9/2014 | Bota et al. |
| 2002/0026323 A1 | 2/2002 | Sakaguchi et al. |
| 2004/0012621 A1 | 1/2004 | Kaneko et al. |
| 2004/0240562 A1 | 12/2004 | Bargeron et al. |
| 2005/0060308 A1 | 3/2005 | Naphade et al. |
| 2005/0257137 A1 | 11/2005 | Weber et al. |

(Continued)

OTHER PUBLICATIONS

Georgieva, "How to Use Youtube's Call-to-Action Overlay Ads," Jul. 1, 2009, https://web.archive.org/web/20110609033018/https://blog.hubspot.com/blog/tabid/6307/bid/4901/how-to-use-youtube-s-call-taction-overlay-ads.aspx.
Notice of Allowance dated Apr. 4, 2018 in U.S. Appl. No. 13/839,843.
Notice of Allowance dated Apr. 23, 2018 in U.S. Appl. No. 13/929,592.
Office Action dated Oct. 2, 2017 in U.S. Appl. No. 13/839,843.
Office Action dated Jan. 20, 2015 in U.S. Appl. No. 13/839,843.
Office Action dated Jan. 30, 2018 in U.S. Appl. No. 13/929,592.

(Continued)

Primary Examiner — Rayeez R Chowdhury
(74) Attorney, Agent, or Firm — Byrne Poh LLP

(57) ABSTRACT

Methods, systems, and media for presenting annotations across multiple videos are provided. In some implementations, methods for presenting annotations across multiple videos are provided, the methods comprising: receiving a selection of an annotation from a user; identifying, by a hardware processor, a plurality of videos associated with the user account to be associated with the annotation; and presenting the annotation upon rendering one of the plurality of videos.

19 Claims, 11 Drawing Sheets

(56) References Cited

U.S. PATENT DOCUMENTS

| | | |
|---|---|---|
| 2007/0174230 A1 | 7/2007 | Marin |
| 2007/0260677 A1 | 11/2007 | DeMarco et al. |
| 2008/0052349 A1 | 2/2008 | Lin |
| 2008/0077952 A1 | 3/2008 | St. Jean et al. |
| 2009/0094637 A1 | 4/2009 | Lemmons |
| 2009/0187825 A1 | 7/2009 | Sandquist et al. |
| 2009/0187859 A1 | 7/2009 | Tuerk et al. |
| 2009/0210779 A1 | 8/2009 | Badoiu et al. |
| 2009/0297118 A1 | 12/2009 | Fink et al. |
| 2009/0300475 A1 | 12/2009 | Fink et al. |
| 2009/0327856 A1* | 12/2009 | Mouilleseaux ...... G11B 27/034 715/230 |
| 2010/0023553 A1 | 1/2010 | Gausman et al. |
| 2010/0083173 A1 | 4/2010 | Germann et al. |
| 2010/0153831 A1 | 6/2010 | Beaton |
| 2011/0173655 A1 | 7/2011 | Blumenschein et al. |
| 2011/0178854 A1 | 7/2011 | Sofer et al. |
| 2011/0185179 A1 | 7/2011 | Swaminathan et al. |
| 2012/0124486 A1 | 5/2012 | Robinson et al. |
| 2013/0031457 A1 | 1/2013 | Griffiths et al. |
| 2013/0145269 A1 | 6/2013 | Latulipe et al. |
| 2013/0198602 A1 | 8/2013 | Kokemohr |
| 2013/0263033 A1 | 10/2013 | Tov et al. |
| 2013/0311595 A1 | 11/2013 | Milatinovici et al. |
| 2014/0019862 A1 | 1/2014 | Fink et al. |

OTHER PUBLICATIONS

Office Action dated Jan. 31, 2017 in U.S. Appl. No. 13/929,592.
Office Action dated Feb. 22, 2016 in U.S. Appl. No. 13/929,592.
Office Action dated Mar. 23, 2017 in U.S. Appl. No. 13/839,843.
Office Action dated May 19, 2016 in U.S. Appl. No. 13/839,843.
Office Action dated Jul. 2, 2015 in U.S. Appl. No. 13/929,592.
Office Action dated Aug. 11, 2016 in U.S. Appl. No. 13/929,592.
Office Action dated Sep. 5, 2017 in U.S. Appl. No. 13/929,592.
Office Action dated Sep. 25, 2015 in U.S. Appl. No. 13/839,843.
Office Action dated Oct. 21, 2016 in U.S. Appl. No. 13/839,843.
PicMarkr, "Free Watermark. Add Custom Watermark with MicMarkr!," May 2, 2010, https://web.archive.org/web/20100502055905/http://picmarkr.com:80/.
Soferman, "Adding watermarks, credits, badges and text overlays to images," May 22, 2012, http://cloudinary.com/blog/adding_watermarks_credits_badges_and_text_overlays_to_images.
Strickland, J., "How YouTube Works", pp. 1-2, available at: http://web.archive.org/web/20090803044324/http://money.howstuffworks.com/youtube4.htm, last accessed Aug. 3, 2009.
YouTube, "YouTube: Most Subscribed Channels", available at http://www.youtube.com/members?s=ms&y=a&g=0, accessed Sep. 3, 2006.

* cited by examiner

METHODS, SYSTEMS, AND MEDIA FOR PRESENTING ANNOTATIONS ACROSS MULTIPLE VIDEOS

This application is a continuation of U.S. patent application Ser. No. 13/839,843, filed Mar. 15, 2013, which is hereby incorporated by reference herein in its entirety.

TECHNICAL FIELD

Background

Generally speaking, a user of a video sharing services or the like may be interested in promoting a brand associated with the user and/or promoting one or more videos associated with the user's account. For example, when a user adds a new video, the user may wish to promote the new video by directing viewers of older videos to the new video. Techniques for directing viewers to a new video often require the user to access each video in a video editor or the like, and manually add in a reference to the new video, such as a link or text promoting the new video.

Accordingly, it is desirable to provide new methods, systems, and media for presenting annotations across multiple videos.

SUMMARY

In accordance with some implementations of the disclosed subject matter, methods, systems, and media for presenting annotations across multiple videos are provided.

In accordance with some implementations of the disclosed subject matter, methods for presenting annotations across multiple videos are provided, the methods comprising: receiving a selection of an annotation from a user; identifying, by a hardware processor, a plurality of videos associated with an account of the user to be associated with the annotation; and presenting the annotation upon rendering one of the plurality of videos.

In accordance with some implementations of the disclosed subject matter, systems for presenting annotations across multiple videos are provided, the systems comprising: a hardware processor configured to: receive a selection of an annotation from a user; identify a plurality of videos associated with an account of the user to be associated with the annotation; and present the annotation upon rendering one of the plurality of videos.

In accordance with some implementations of the disclosed subject matter, systems for presenting annotations across multiple videos are provided, the systems comprising: means for receiving a selection of an annotation from a user; means for identifying a plurality of videos associated with an account of the user to be associated with the annotation; and means for presenting the annotation upon rendering one of the plurality of videos.

In some embodiments, the annotation includes at least one of text, animation, an image, a hyperlink, and a video.

In some embodiments, the system further comprises means for receiving a selection of a location in which to present the annotation.

In some embodiments, the system further comprises means for receiving a selection of a period of time during which to present the annotation when rendering a video.

In some embodiments, the system further comprises means for presenting the annotation upon rendering a video that has been associated with the account after the selection of the annotation has been received.

In some embodiments, the plurality of videos are a subset of all videos associated with the user account; and the system further comprising means for inhibiting presentation of the annotation upon rendering videos not included in the plurality of videos.

In some embodiments, the system further comprises means for changing the annotation periodically based on a rule.

In some embodiments, the system further comprises means for specifying a second annotation to be associated with the plurality of videos.

In some embodiments, the system further comprises causing content associated with the annotation to be presented in response to selection of the annotation when presented.

In some embodiments, the plurality of videos is all videos of the account.

In accordance with some implementations of the disclosed subject matter, non-transitory computer-readable media containing computer executable instructions that, when executed by a processor, cause the processor to perform a method for presenting annotations across multiple videos, the method comprising: receiving a selection of an annotation from a user; identifying a plurality of videos associated with the user account to be associated with the annotation; and presenting the annotation upon rendering one of the plurality of videos.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

DETAILED DESCRIPTION

In accordance with some implementations of the disclosed subject matter, mechanisms for presenting annotations across multiple videos are provided.

In some implementations, these mechanisms can provide a user interface for annotating videos associated with a user account of a user (e.g., a video publisher, a video owner, a content owner, a content publisher, etc.) of a video hosting and/or video sharing service (e.g., a service that facilitates viewers watching videos made available by users).

In some implementations, these mechanisms can present the user interface to the user, and receive a user selection of one or more annotations to associate with various videos associated with the user account. Additionally, these mechanisms can receive a user selection of the annotation to associate with videos associated with the account without presenting any of the videos associated with the account to the user (e.g., without presenting the user with a video editing interface or the like). For example, the mechanisms can receive a user selection of a particular video associated with the user account to use as the basis for an annotation to be used across all videos associated with the user account. This can allow the user to feature or promote a particular video (e.g., a new video) across all of the videos associated with the user account. As another example, the mechanisms can receive a user indication of a logo or other branding associated with the user account to be associated with all videos of the user account. This can allow the user to promote the brand of the user account across all of the videos associated with the account.

In some implementations, the annotation can include an image to be presented when a video associated with the account is rendered in response to a request from a viewer. Additionally, the annotation can include a link (e.g., instructions) that causes a viewer to be presented with content associated with the annotation when the annotation is selected by the viewer. For example, if a video annotation is associated with a video, selection of the video annotation can cause the video that forms the basis of the video annotation to be rendered.

Figure 1:
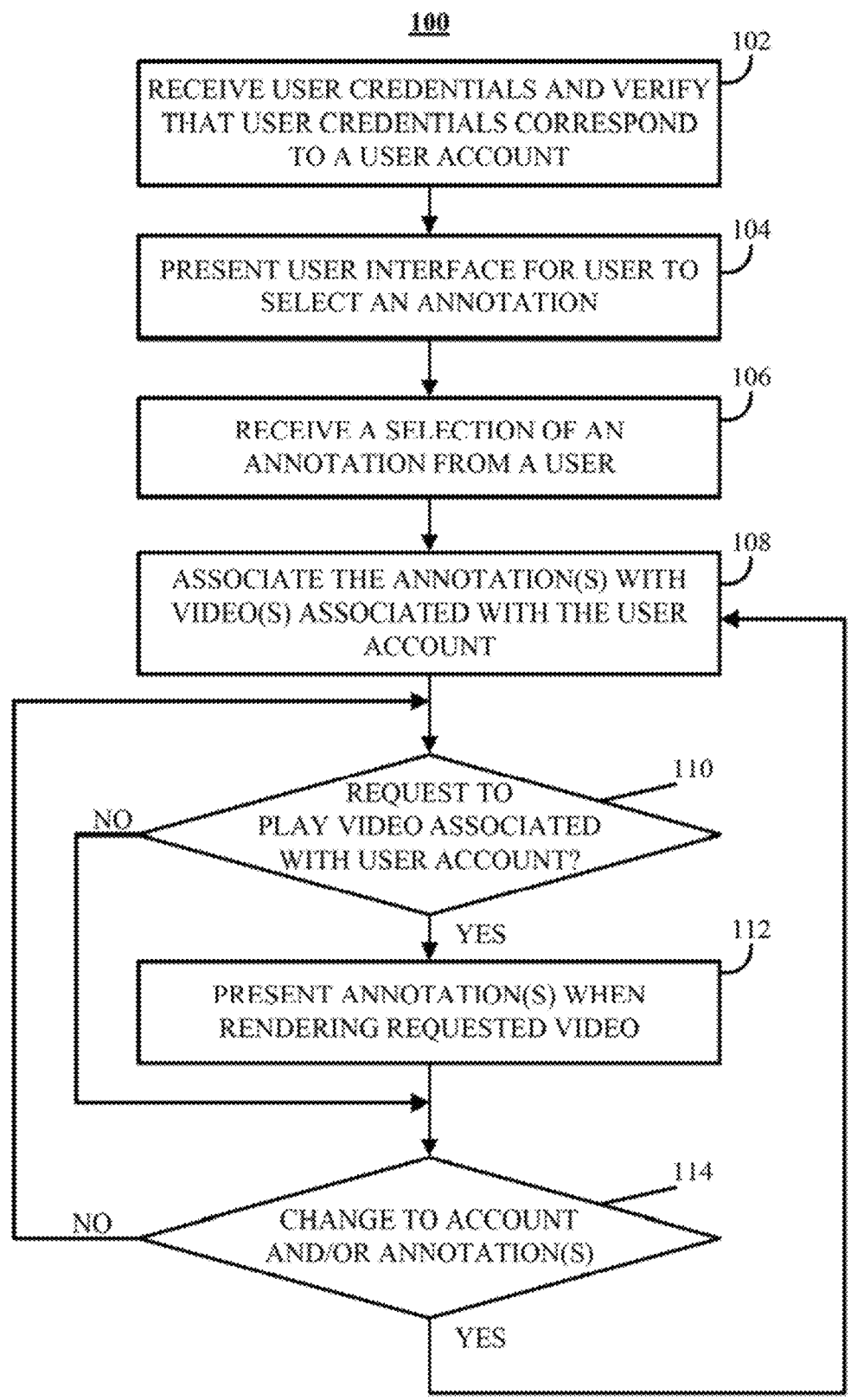
FIG. 1 shows an example of a process for presenting annotations across multiple videos in accordance with some implementations of the disclosed subject matter.

Turning to FIG. 1, an example 100 of a process for placing annotations across multiple videos is shown in accordance with some implementations of the disclosed subject matter. As illustrated, at 102, process 100 can receive user credentials, and the received credentials can be verified to determine whether the credentials correspond to a particular user account and/or whether the credentials are the proper credentials for accessing the user account. Any suitable technique(s) can be used to receive and/or verify user credentials. For example, in some implementations, process 100 can request a username and a password from a user, and a received username and password combination can be checked to determine whether the combination corresponds to a user account. As another example, process 100 can request biometric information (e.g., a fingerprint, a palm print, a retina scan, etc.) from a user, and received biometric information can be checked to determine whether it corresponds to a user account. As yet another example, process 100 can determine whether a device being used by the viewer is already signed in to a particular account (e.g., user credentials have previously been received and verified).

In some implementations, one set of credentials can be associated with multiple user accounts. For example, a user at a marketing company can be associated with multiple user accounts, and credentials for the marketing company user can correspond to multiple user accounts. In such an example, a user can be requested to select a particular user account. Additionally or alternatively, multiple sets of user credentials can be associated with a single user account. For example, multiple users can have access to a single user account.

At 104, process 100 can present a user interface to a user to allow the user to select an annotation to be presented with videos associated with the user account. Such a user interface can be presented to a user using any suitable technique(s). For example, process 100 can cause the user interface to be presented to a user as a graphical user interface (GUI) in a web page or a portion of a web page loaded by a browser running on a computing device. As another example, the user interface can be presented to a user as a GUI that is part of an application (e.g., an application for a personal computer, an application for a mobile computing device, etc.) for managing a user account, wherein the application can interact with process 100 in managing the user account. As yet another example, the user interface can be presented to a user by a user interface application as a GUI, using an application programming interface (API) to load the interface and/or interact with process 100. As still another example, the user interface can be presented as a non-graphical user interface such as through the use of text and/or sound.

At 106, process 100 can receive a user selection of an annotation (or annotations) to be presented with videos associated with the user account. The selection of the annotation can be made using any suitable technique(s).

Figure 2:
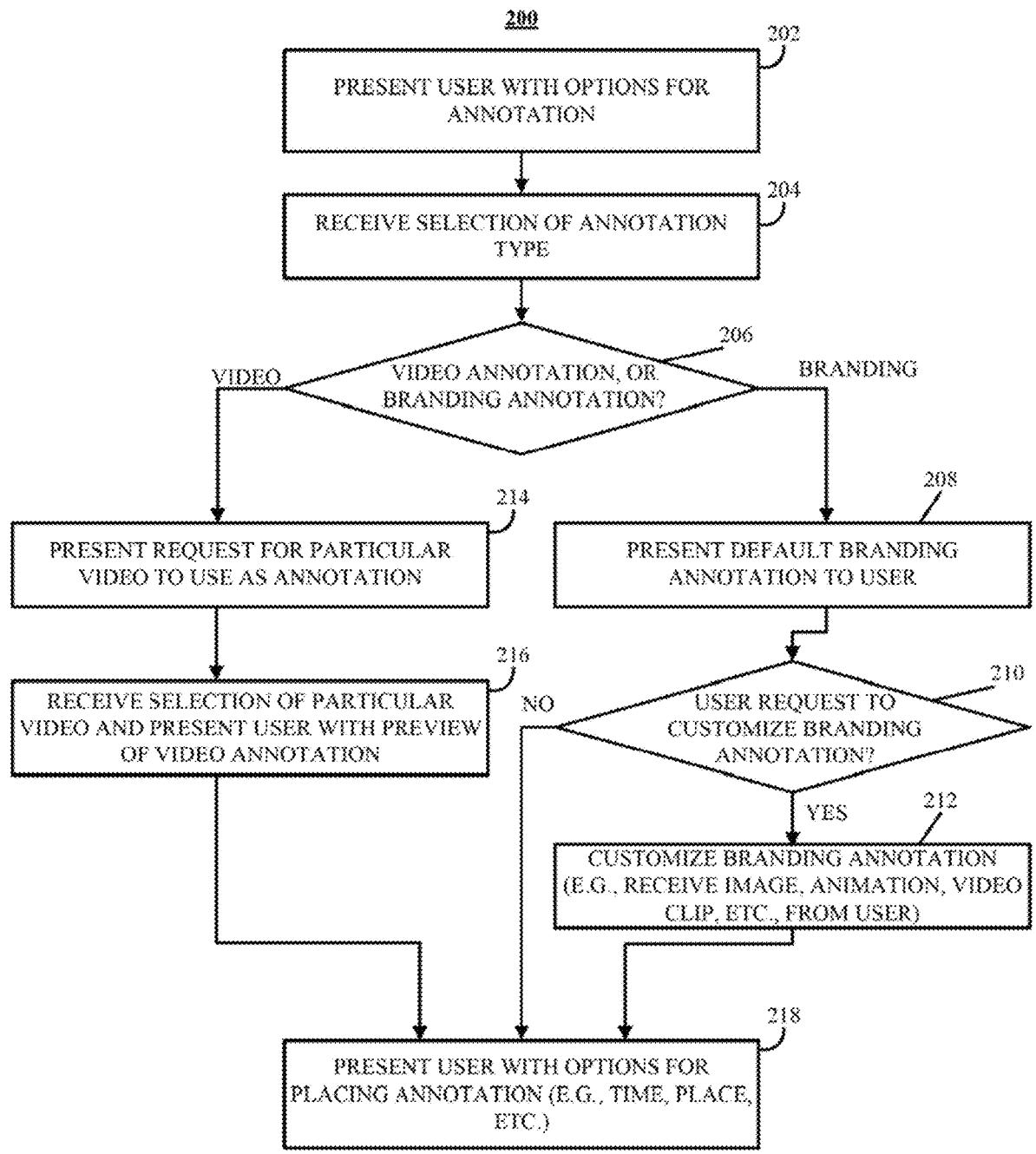
FIG. 2 shows an example of a process for selecting an annotation in accordance with various implementations of the disclosed subject matter.

FIG. 2 shows an example 200 of a process for presenting a user interface for selecting an annotation to be presented across multiple videos in accordance with some implementations of the disclosed subject matter. At 202, process 200 can cause options to be presented for a user to choose a type of annotation to present with videos associated with the user account. For example, a user can be presented with a user interface as described above in connection with 104 of FIG. 1.

Figure 3:
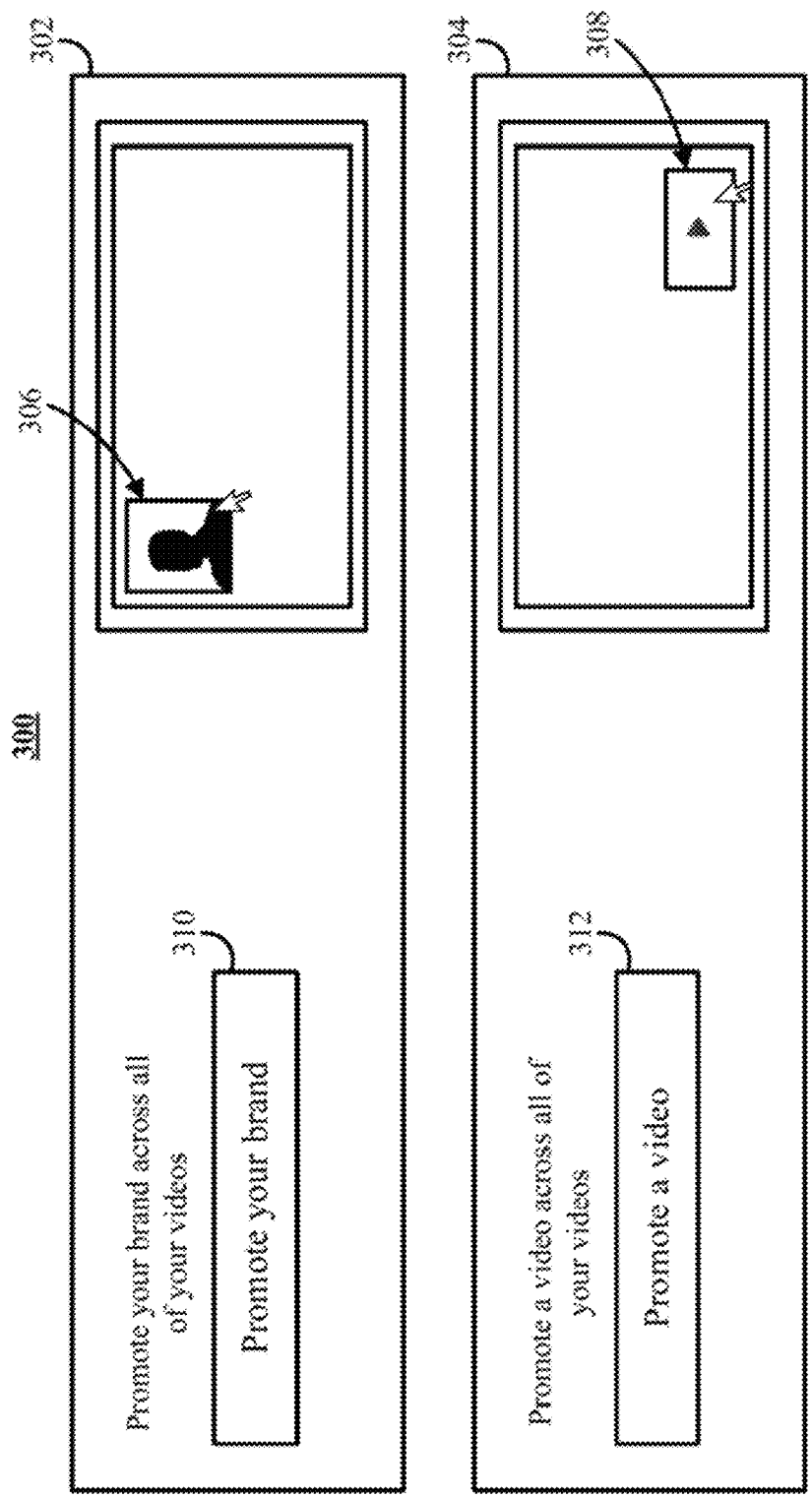
FIG. 3 shows an example of a user interface for selecting a type of annotation in accordance with some implementations of the disclosed subject matter.

FIG. 3 shows a particular example 300 of a user interface for presenting a user with options for choosing an annotation to be presented with videos associated with the user account in accordance with some implementations of the disclosed subject matter. In user interface 300, a user can be presented with choices of different types of annotations to associate with videos associated with the user account. More particularly, a user can be presented with a user interface element 302 for choosing an annotation to promote a brand of the user account, and a user interface element 304 for choosing an annotation to promote a video. User interface 300 can also present a representation 306 of a brand annotation as it might be presented in a video and a representation 308 of a video annotation as it might be presented in a video.

Returning to FIG. 2, at 204, process 200 can receive a selection of a type of annotation to be presented with videos associated with the user account. Process 200 can receive a user selection using any suitable technique(s). For example, a selection can be received using a web page (e.g., using a pointing device such as a mouse) or using an application (e.g., using a touch sensitive display or the like) and the selection can be communicated over a network to process 200. As a more particular example, as shown in FIG. 3, process 200 can receive a user selection using user interface 300 upon a user selecting a user interface element 310 or a user interface element 312. In some implementations, user interface element 310 and user interface element 312 can be any suitable user interface feature, such as a button, a link, a switch, etc. In user interface 300, a branding annotation can be selected in response to a user selecting user interface element 310 or a video annotation can be selected in response to a user selecting user interface element 312.

Returning to FIG. 2, at 206, process 200 can determine whether the user has selected a video annotation or a branding annotation. If the user has selected a branding annotation ("BRANDING" at 206), process 200 can proceed to 208.

At 208, process 200 can present a default branding annotation to the user. The default branding annotation can include any suitable default annotation. For example, the default annotation can include a logo or an image that has previously been associated with the user account. As another example, the default annotation can include an image associated with another account linked to the user account, such as a social media account associated with the same user. As yet another example, the default annotation can include a thumbnail from a video associated with the user account, such as a most-watched video associated with the user account.

In some implementations, a branding annotation can be used to promote a brand identity of an account or a part of an account. For example, if an account is associated with a musician, a brand identifier of the musician such as a logo, a name, or the like, can be used as a brand annotation. Additionally, the brand annotation can be configured such that when the brand annotation is presented during the rendering of a video, selection of the brand annotation (e.g., selection on a client device by a viewer) can cause a device rendering the video (e.g., the client device) to navigate to a location associated with the brand.

For example, selection of the branding annotation can cause the rendering device to navigate to a location where videos associated with the account are aggregated. The rendering device can be navigated to any suitable location. For example, in some implementations, the rendering device can be navigated to an account home page. As another example, in some implementations, the rendering device can be navigated to a channel associated with the account. In some implementations, a channel can be a collection of one or more media content. More particularly, for example, a collection of content from a common source or relating to a common topic can be a channel. In some implementations, a channel can be subscribed to by a user.

As another example, selection of the branding annotation can cause the rendering device to navigate to a home page or other page associated with the user account. For instance, if the account is associated with a musician, selecting the brand annotation can cause the rendering device to navigate to the musician's home page; or if the account is associated with a brand of products, selecting the brand annotation can cause the rendering device to navigate to a web page associated with the brand.

In some implementations, selecting the branding annotation can cause the rendering device to ask the viewer whether he/she would like to subscribe to videos associated with the account (e.g., using a Web page, an app interface, etc.), to receive a request from the viewer to subscribe to videos associated with the account, and/or to establish a subscription to videos associated with the account for the viewer. For example, in some implementations, upon selecting the branding annotation, the viewer can be automatically subscribed to videos associated with the account. As a more particular example, in response to the viewer hovering a pointer over the branding annotation, a "Subscribe" button can be presented, and, upon the viewer selecting the button, a subscription to videos associated with the account can be established for the viewer.

Figure 4:
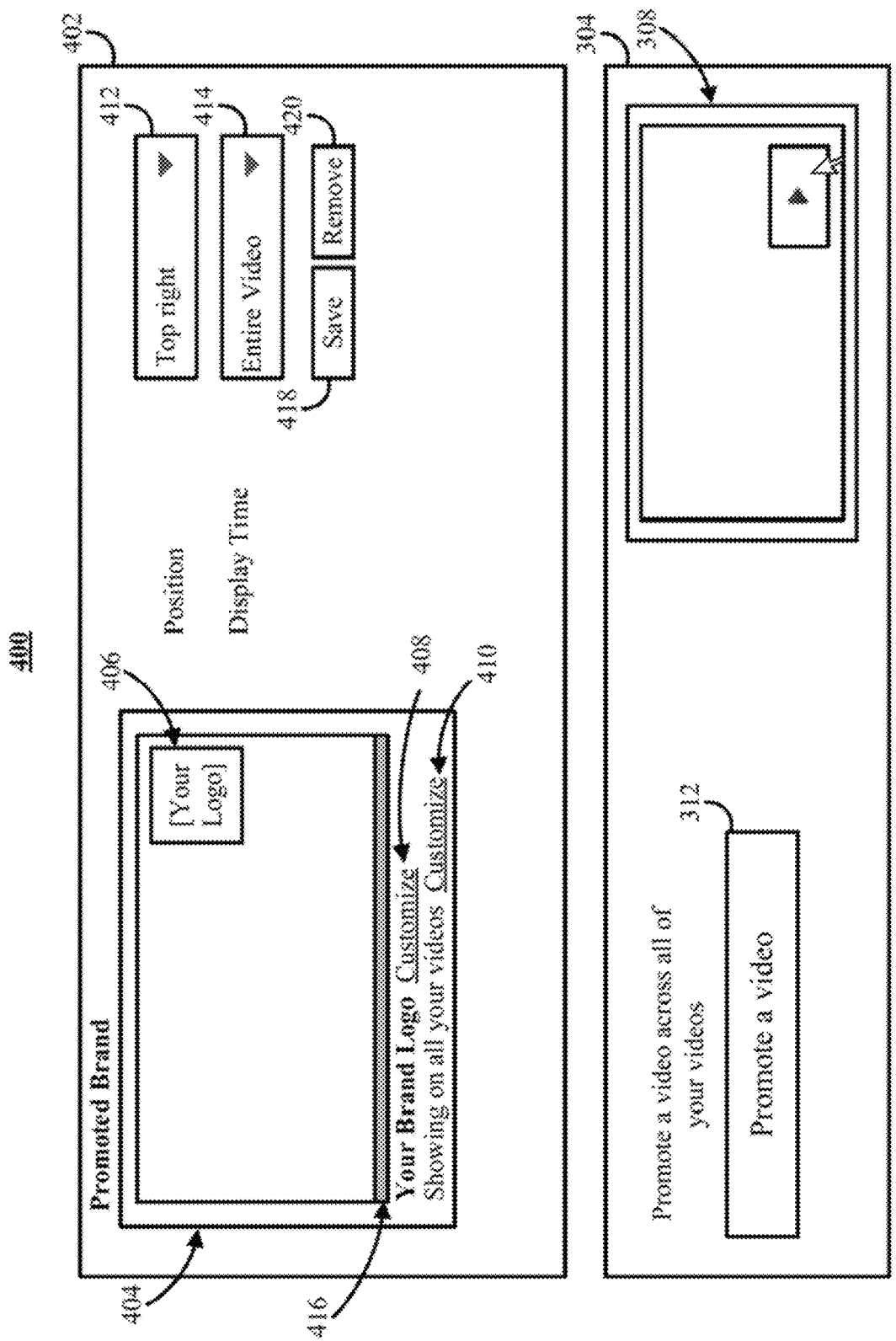
FIG. 4 shows an example of a user interface for configuring and showing a preview of a brand annotation in accordance with some implementations of the disclosed subject matter.

FIG. 4 shows an example 400 of a user interface for setting a branding annotation and presenting a preview of the branding annotation to a user. User interface 400 can include a user interface element 402 for facilitating the setting of a branding annotation by a user. In some implementations, user interface element 402 can include a preview 404 that presents to the user how a branding annotation may look when presented with a video associated with the user account. Preview 404 can include any suitable imagery, such as an image of a blank screen, a generic image, a generic video, a clip from a video associated with the user account, a screen shot of a video associated with the user account, etc.

In some implementations, user interface 400 can include a sample 406 of the branding annotation and an example placement of sample 406 (e.g., top right). Sample 406 can include a preview of any suitable branding annotation, such as the default branding annotation described above in connection with FIG. 2, or a customized branding annotation as described below. As shown in user interface 400, a placement of the branding annotation as it will be presented in association with videos associated with the account can be shown in preview 404. Additionally, an initial placement of the branding annotation can be set at a default such as the top right corner as shown in user interface 400.

Referring back to FIG. 2, at 210 process 200 can determine whether the user has selected an option to customize the branding annotation (e.g., the look of the branding annotation or the videos with which to present the branding annotation). Any suitable technique(s) can be used to determine whether a user has selected to customize the branding annotation. For example, when it is determined that a user has selected a branding annotation at 204, process 200 can query the user to determine whether to use the default branding annotation or whether to use a custom branding annotation. As another example, after a default branding annotation has been presented to the user, process 200 can prompt a user to select a particular user interface element to customize the branding annotation.

FIG. 4 shows a more particular example of user interface elements 408 and 410 that can be presented for receiving a user indication to customize the branding annotation shown in sample 406 and/or to customize selection of which videos the branding annotation will be associated with. These user interface elements 408 and 410 can include any suitable user interface elements such as a selectable user interface button, a selectable link, etc.

If it is determined that the user has chosen to customize the branding annotation ("YES" at 210), process 200 can proceed to 212. At 212, the look of the branding annotation and/or the selection of which videos the branding annotation will be associated with can be customized. For example, as described above in connection with FIG. 4, the look of the branding annotation can be customized by receiving a selection of user interface element 408, and selection of an item to use as the branding annotation. In some implementations, a file (e.g., stored locally or remotely, etc.), a URL, etc., can be selected as the item to be used as the branding annotation. In some implementations, a user can be instructed that certain types of items are suitable for use as a branding annotation such as image files, which may include still images, animated images, video clips, etc. Additionally or alternatively, a user can be requested to specify a destination (e.g., an account page, a homepage, a web page, etc.) to associate with the branding annotation.

In some implementations, process 200 can receive a user indication to customize the selection of videos that the branding annotation will be associated with upon the user selecting user interface element 410. For example, the selection of which videos the branding annotation will be associated with can be customized by process 200 receiving a selection of user interface element 410 and prompting the user to choose videos from among some or all videos associated with the user account. Any suitable technique(s) can be used to choose the selection of videos that the branding annotation will be associated with. For example, a list with check boxes that can be checked or unchecked to indicate whether corresponding videos are included or excluded can be used. As another example, a comprehensive list of videos associated with the account can be presented and a video can be excluded from being associated with the branding annotation by being selected for exclusion.

Referring back to FIG. 2, if it is determined that the user has not requested to customize the branding annotation ("NO" at 210), or after branding annotation customization at 212, process 200 can proceed to 218.

At 218, process 200 can present the user with options for placing the branding annotation to be presented with videos associated with the user account. A placement of the branding annotation can be set using any suitable technique(s). For example, in some implementations, process 200 can present the user with a list of placements and/or times at which to present the branding annotation. As another example, process 200 can query the user for a location at which to place the branding annotation (e.g., by receiving text coordinates, by receiving a selection from a pointing device, etc.) and/or for a time at which to present the branding annotation (e.g., by receiving a user selection of a time on a timeline expressed as a percentage of a video's length).

In some implementations, a placement of the branding annotation can be based on a selection made using user interface element 412 as shown in user interface 400 of FIG. 4. User interface element 412 can be presented as a drop down list that the user can utilize to select a placement of the branding annotation. For example, drop down list 412 can include various positions, such as "top right," "top middle," "top left," "left," "right," "middle," "bottom left," "bottom middle," "bottom right," etc. In response to receiving a user selection of a different position, process 200 can change the position of sample 406 in user interface 400 to demonstrate to the user where the new placement will be with respect to a rendering video. Additionally or alternatively, any other suitable technique(s) can be used for determining a placement of a branding annotation. For example, a list with radio buttons can be presented to the user for choosing a location of the branding annotation. As another example, process 200 can determine a placement of the branding annotation by receiving a user selection of sample 406 (e.g., from a pointing device, from a touchscreen or touchpad, etc.) and an indication of a new placement (e.g., by receiving a selection of a portion of user interface 400, by receiving an indication of a dragging operation and receiving an indication that a selection has ceased, etc.).

It should be noted that although the placements for the branding annotation are discussed as being presented within the video, in some implementations, a branding annotation can be placed in a location other than within a video. For example, the branding annotation can be presented beside a video so as not to overlap content in the video.

Figure 6A:
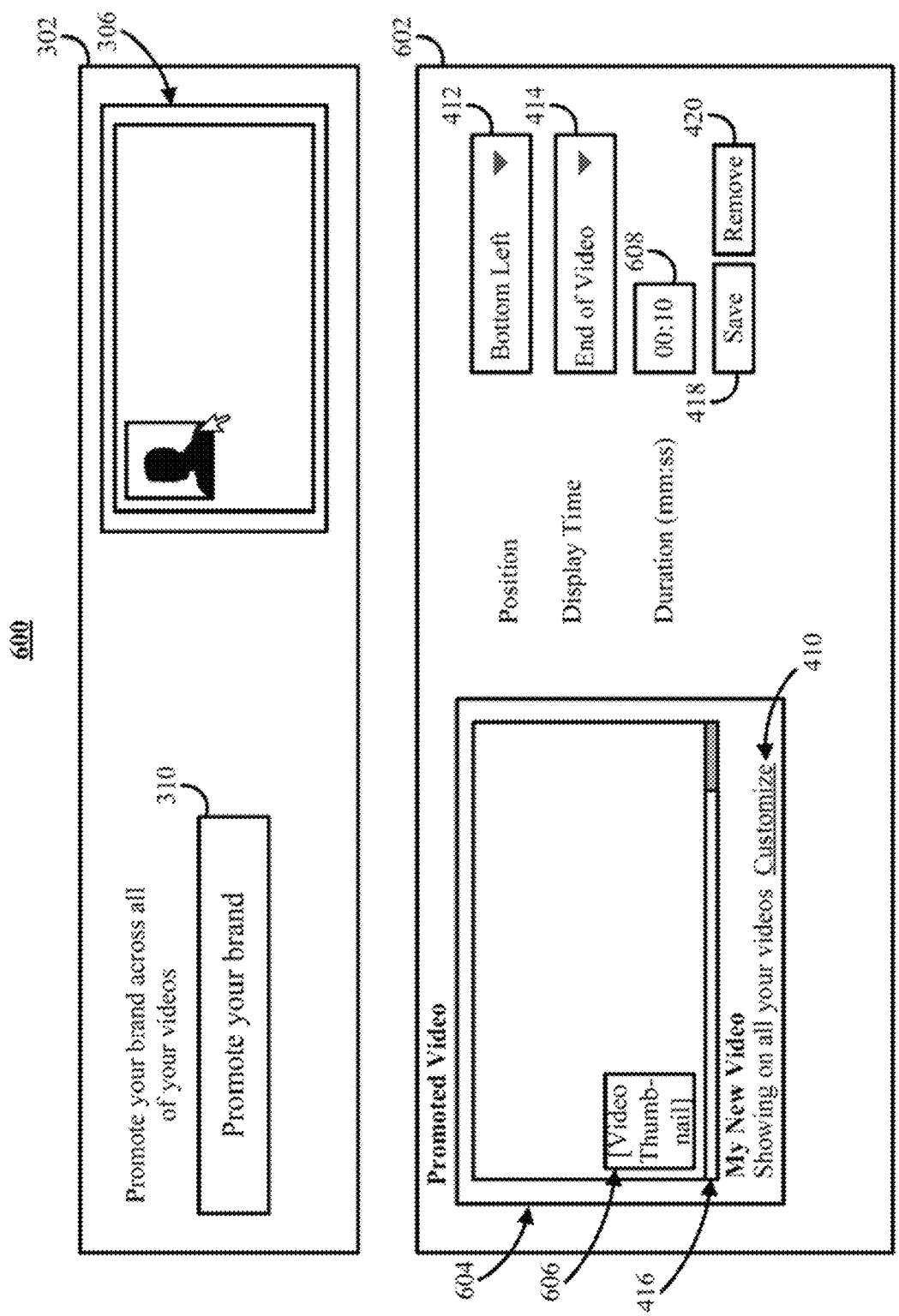
FIGS. 6A and 6B show examples of a user interface for configuring and showing a preview of a video annotation in accordance with some implementations of the disclosed subject matter.
Figure 6B:
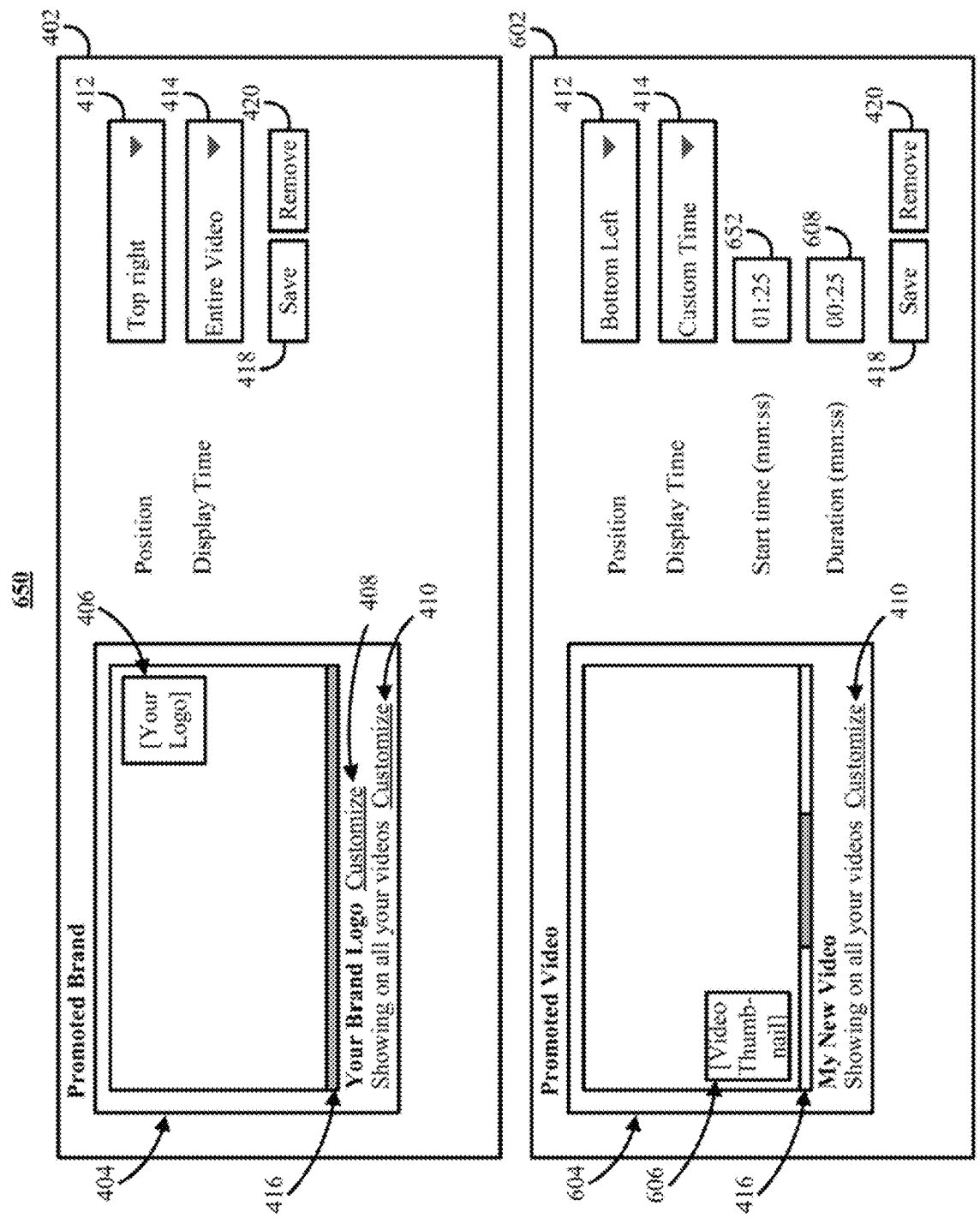

In some implementations, a time when the branding annotation is to be presented can be set in response to a receiving an input using user interface element 414 as shown in user interface 400 of FIG. 4. User interface element 414 can be presented as a drop down list that the user can utilize to select a time when the branding annotation is to be presented. For example, drop down list 414 can include various time periods, such as "entire video," "end of video," "beginning of video," "middle of video," "custom time," etc. Additionally, a timing indication 416 can be presented with preview 404 to represent to a user the time that the user has chosen to present the branding annotation with videos associated with the user account. In some implementations, timing indication 416 can change depending on a time period set using drop down list 414. For example, as shown in user interface 400, "entire video" is currently selected as the time period during which to display the branding annotation, and timing indication 416 can be used to indicate such by occupying the entire width of the video as shown in preview 404. FIGS. 6A and 6B show other examples of timing indications 416 that can be presented in connection with a rendering video in some implementations.

Referring back to FIG. 4, in some implementations, user interface 400 can include user interface element 418 and user interface element 420 for receiving a selection of whether to save a current placement and/or time of a branding annotation (e.g., by selecting user interface element 418) or to remove the branding annotation from all videos or selected videos (e.g., by selecting user interface element 420).

Returning to FIG. 2, if it is determined that the user selects a video annotation at 206 ("VIDEO"), process 200 can proceed to 214. At 214, process 200 can present a request to the user to select a particular video to use as the basis of the video annotation. A user can be requested to select a particular video using any suitable technique(s). For example, in some implementations, process 200 can prompt the user to choose a video from among all videos associated with the user account. As another example, process 200 can request that a user provide a URL corresponding to a video associated with the user account. As yet another example, process 200 can request that a user provide a URL corresponding to any video associated with a service which provides access to the account (e.g., a video hosting service).

In some implementations, process 200 can present a user with options for choosing a video by rule, such as choosing a video that was most recently associated with the account (e.g., a new video), choosing a video at random, choosing a video from among a set of videos chosen by a user, etc. In a more particular example, process 200 can receive a user indication of a schedule of which video to use as the basis for a video annotation during different time periods (e.g., different days of the week, etc.). As another example, process 200 can receive a user indication of a rule to determine a video to show, such as a next video in a series if a current video is a part of a series, a next video associated with the account, a most popular video, a newest video, etc. As yet another example, process 200 can receive a user indication of a particular video, and a user indication to set a rule such that if the user is currently broadcasting anything live (e.g., streaming a video), that the live broadcast will be used as the basis for the video annotation while it is ongoing.

As still another example, process 200 can receive a user indication to choose a video to be used as the basis for the video annotation based on the identity of a viewer. For instance, if it is determined that the viewer has recently watched a video that the user indicated is to be used as the basis for a video annotation, the viewer can instead be presented with a different video that the viewer has not recently watched. Additionally or alternatively, process 200 can receive a user selection of a video to use as the basis for the video annotation based on a viewer's past behavior, which can include, for instance, videos recently watched by the viewer, observed preferences of the viewer, etc.

Figure 5:
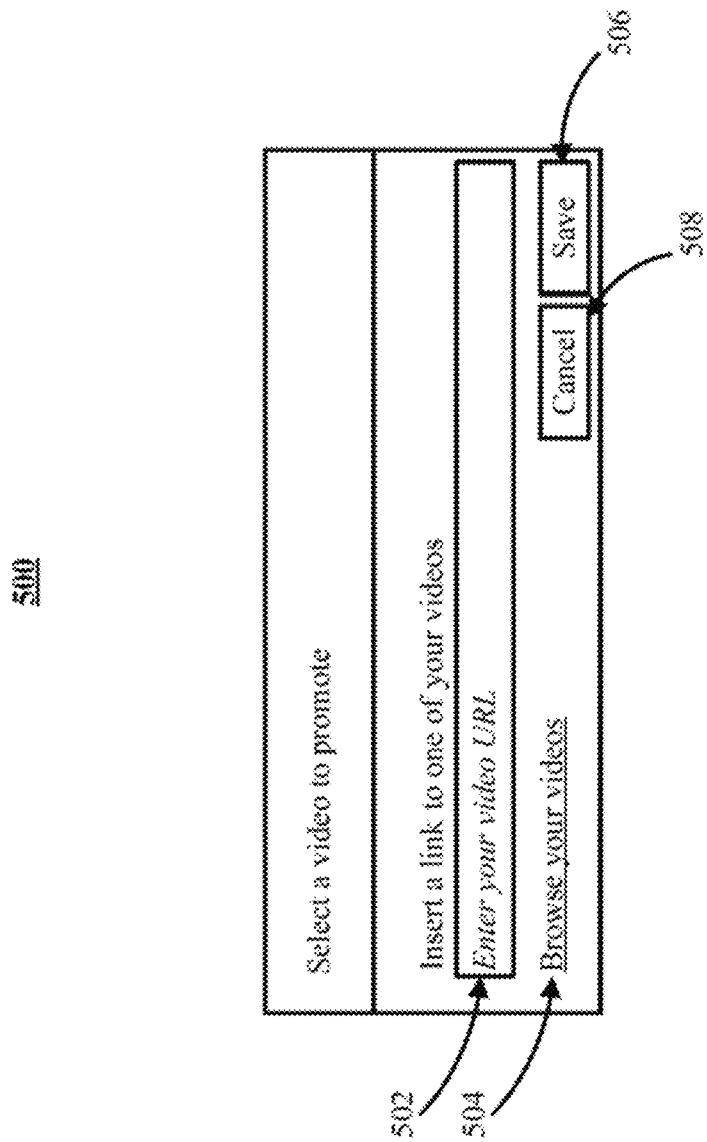
FIG. 5 shows an example of a user interface for selecting a video on which to base a video annotation in accordance with some implementations of the disclosed subject matter.

FIG. 5 shows a particular example 500 of a user interface for presenting a request to a user to specify a particular video to associate with the video annotation. In some implementations, user interface 500 can be presented as an overlay to, for example, user interface 300 or user interface 400 when process 200 receives a selection of user interface element 312. As shown in FIG. 5, process 200 can prompt a user to select a video to present as a video annotation by inserting a URL into a text box 502, or to select a user interface element 504 to browse videos associated with the user account. In some implementations, process 200 can receive a URL of a video in box 502 to use as the basis for a video annotation, and can select the video indicated by the URL in response to receiving a selection of user interface element 506. Additionally or alternatively, process 200 can receive a selection of user interface element 504 that indicates that the user selected to browse the videos associated with the user account, and process 200 can present a user interface (not shown) to allow the user to select a video to use as the basis of the video annotation from among videos associated with the user account. After process 200 receives a user selection of a video using the browse function, in some implementations, process 200 can insert a URL of the chosen video into box 502, or the selected video can be used to specify the video to associate with the video annotation.

User interface 500 can also include a user interface element 508 for cancelling the action of selecting a video to use as the basis for a video annotation. In some implementations, if process 200 receives a selection of user interface 508 to cancel the video annotation, process 200 can return the user interface to user interface 300 or user interface 400, for example.

Referring back to FIG. 2, process 200 can receive a user selection of a particular video to use as the basis for a video annotation at 216, and can cause the user to be presented with a preview of the video annotation. Any suitable technique(s) can be used for previewing the video annotation to a user.

FIG. 6A shows an example 600 of a user interface for presenting a preview of a video annotation to a user. User interface 600 can include a user interface element 602 for facilitating the setting of a video annotation by a user. In some implementations, user interface element 602 can include a preview 604 that presents to the user how a video annotation may look when presented with a rendering video. User interface element 602 can also include a sample 606 of a video annotation for the video selected at 216, which can be placed at any suitable positions, such as a default position. If a branding annotation is associated with the videos of a user account, the default position of the video annotation can be set such that the branding annotation and the video annotation will not be presented in the same location. In some implementations, sample 606 can show a thumbnail of the video selected at 214, or if multiple videos are chosen, sample 606 can rotate between thumbnails for the multiple different videos.

Referring back to FIG. 2, after the user is presented with a preview of the video annotation at 216, process 200 can proceed to 218. At 218, process 200 can present the user with options for the placement and the timing of the video annotation to be presented with videos associated with the user account. In some implementations, these options can be similar for the video annotations as for the branding annotations as described above in connection with FIG. 4. For example, user interface element 602 can include a drop down list 412 for choosing a position to place the video annotation and a drop down list 414 for choosing a display time at which to present the video annotation.

As shown in FIG. 6A, in some implementations the display time can be set as "end of video" and this setting can be reflected in timing indication 416 occupying a time period at the end of the video. In some implementations, if the display time is chosen as the beginning or end of video, a user interface element 608 can be presented to the user for choosing a duration for which top present the video annotation. Additionally, duration 608 can be set as a default time (such as ten seconds, twenty seconds, etc.) or as a default percentage of the total video time (e.g., five percent, ten percent, etc.) and can be set by a user to any suitable value.

FIG. 6B shows another example 650 of a user interface having user interface element 602 where a custom time is selected in drop down list 414. As shown in FIG. 6B, when a custom time is chosen, a user selection of a duration can be received using user interface element 608 and a start time can be received using a user interface element 652. Furthermore, as shown in FIG. 6B, if it is determined that a both a branding annotation and a video annotation have been selected, both user interface element 402 and user interface element 602 can be presented to the user at the same time.

Referring back to FIG. 2, at 218, process 200 can present the user with options for determining a placement of any annotation associated with the user account. For example, if process 200 determines that the user has chosen to display one branding annotation with a first subset of videos and another branding annotation with another subset of videos, different user interface elements can be presented for placing these branding annotations. As another example, as shown in FIG. 6B, a placement of a branding annotation and a video annotation can be set using the same user interface 650.

Figure 7:
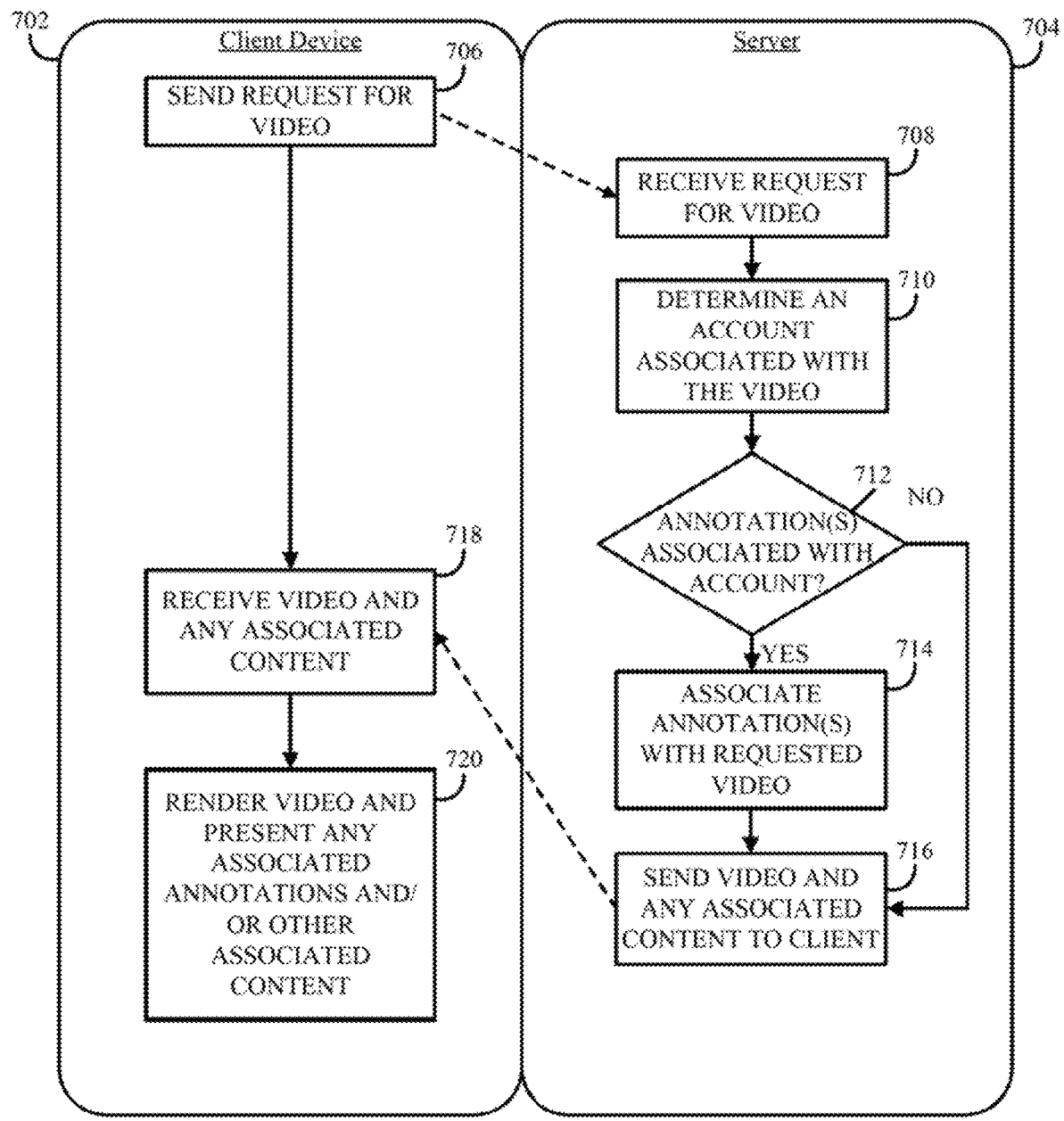
FIG. 7 shows a diagram illustrating a data flow for presenting an annotation in accordance with some implementations of the disclosed subject matter.

FIG. 7 shows an example 700 of a data flow for presenting an annotation in accordance with some implementations of the disclosed subject matter. In the example shown in FIG. 7, a client 702 (e.g., a personal computer, a tablet computer, etc.) can send a request to a server 704 for a particular video at 706.

At 708, server 704 can receive the request for the video. In some implementations, server 704 can determine whether the video that is requested exists and is viewable by the particular viewer using client device 702. For example, the video that is requested may not exist (e.g., the request may contain a bad request that does not reference a valid video). As another example, the video requested may be a private video that the viewer does not have access to (e.g., credentials of the viewer can be checked to determine whether the viewer has access to the private video). As yet another example, the video may exist but be blocked due to geographic restrictions, because an owner of the content requested that the video not be viewable, or for any other suitable reason. If client 702 is not authorized to view the video and/or if the video does not exist, a message (not shown) can be sent back to client 702 indicating such.

At 710, server 704 can determine an account associated with the video requested at 708. Any suitable technique(s)

can be used to determine an account associated with the video such as by maintaining a database of accounts and their associated videos.

At 712, server 704 can determine whether there are any annotations associated with the account, such as a branding annotation or a video annotation as described above in connection with FIGS. 1-6B. In some implementations, annotations can be individually associated with each video, and in such implementations server 704 can determine whether any annotations are associated with the video at 712.

If annotations are associated with the account ("YES" at 712), server 704 can associate the annotation(s) that are associated with the account with the requested video at 714. After the annotations are associated with the video, server 704 can move to 716. At 716, the server can send the video with any associated content to client 702. In some implementations, associated content can include annotations as described herein. Additionally, associated content can include any other content sent with the video including advertisements, recommendations for further videos, video specific annotations (e.g., an annotation inserted by a user into a particular video using, for example, video editing software), video metadata, account information (e.g., a name and a link to an account that the video is associated with), etc.

Otherwise, if annotations are not associated with the video ("NO" at 712), server 702 can move to 716 and send the video with any other associated content (e.g., other than annotations as described herein) as described above.

At 718, client 702 can receive the video and any associated content. The video can be received using any suitable technique(s), such as by receiving a file containing the video, receiving a stream of data representing the video, etc.

At 720, client 702 can render the video received at 718 and can present any associated annotations. In some implementations, the annotations can be presented at a particular location specified by a user of the user account (e.g., by receiving a user indication of a placement at 218 of FIG. 2). Additionally, client 702 can present any other associated content to a viewer, such as advertisements, metadata, account information, etc., as appropriate.

In some implementations, annotations can be presented to users overlaid on the video as the video is being rendered, and in some cases the viewer can be presented with the option of inhibiting the annotations. Alternatively, the annotations can be presented to viewers as part of the video (e.g., integrated into the video content), and the viewer may not have the option of inhibiting the annotations.

In some implementations, whether annotations are to be presented to a viewer can be based on one or more properties of client 702. For example, if client 702 is a personal computer or laptop computer, annotations can be presented to the viewer when rendering the video. As another example, if client 702 is a mobile computing device (e.g., a smartphone, a mobile phone, a wearable computer, etc.) presentation of annotations can be inhibited. Additionally or alternatively, whether annotations are presented to a viewer can be based on a type of application being used to render the video. For example, if the application being used to render the video is a browser based application (e.g., Flash, HTML, etc.) annotations can be presented to the viewer when rendering the video. As another example, if the application being used to render the video is an application (e.g., an application for rendering videos associated with a particular video hosting service) presentation of annotations can be inhibited.

In some implementations, as described above in connection with FIG. 2, an action can be associated with viewer selection of the annotation. For example, if the annotation is a brand annotation, selecting the annotation can cause client 702 to navigate to a location associated with the user account, such as a particular channel of a video hosting service, a home page of the brand associated with the user account, etc. As another example, if the annotation is a video annotation, selecting the annotation can cause client 702 to render the video associated with the video annotation (e.g., a video chosen as described in connection with, for example, FIGS. 2 and 5). In a more particular example, receiving an indication that a pointing device is hovering over a video annotation (and/or receiving a single selection of the video annotation) can cause the video that forms the basis of the video annotation to begin rendering in a smaller format than the currently rendering video (e.g., in a picture-in-picture format), which may be larger than the video annotation as presented in association with the currently rendering video (e.g., the video annotation can be rendered in a format between the format of the video annotation and the format of the currently rendering video). Additionally, in such an example, the currently rendering video can be paused and/or muted during rendering of the video annotation video.

It should be noted that although the annotations as described herein are described as being either a branding annotation or a video annotation, in some implementations, the mechanisms described herein can be used to associate any type of annotation with multiple videos associated with a user account. For example, annotations can be added for menu-like actions that can be performed based on a currently rendering video. More particularly, buttons can be added that take a viewer to a next episode in a series or a next video in a playlist, that allow the viewer to subscribe to the account or the series that the currently rendering video is associated with, or any other suitable menu functions. In another example, an annotation can be added that provides an icon and/or link that, when selected by a viewer, causes client 702 rendering the video to navigate to a social media presence associated with the user account.

It should also be noted that the annotations can take any shape and include any features. For example, annotations need not be rectangular and can be any shape specified by a user. As another example, annotations can take the form of a ticker at the bottom or top of a video, which can be updated by a user in real-time to display any suitable messages to viewers of videos associated with the user account.

Figure 8:
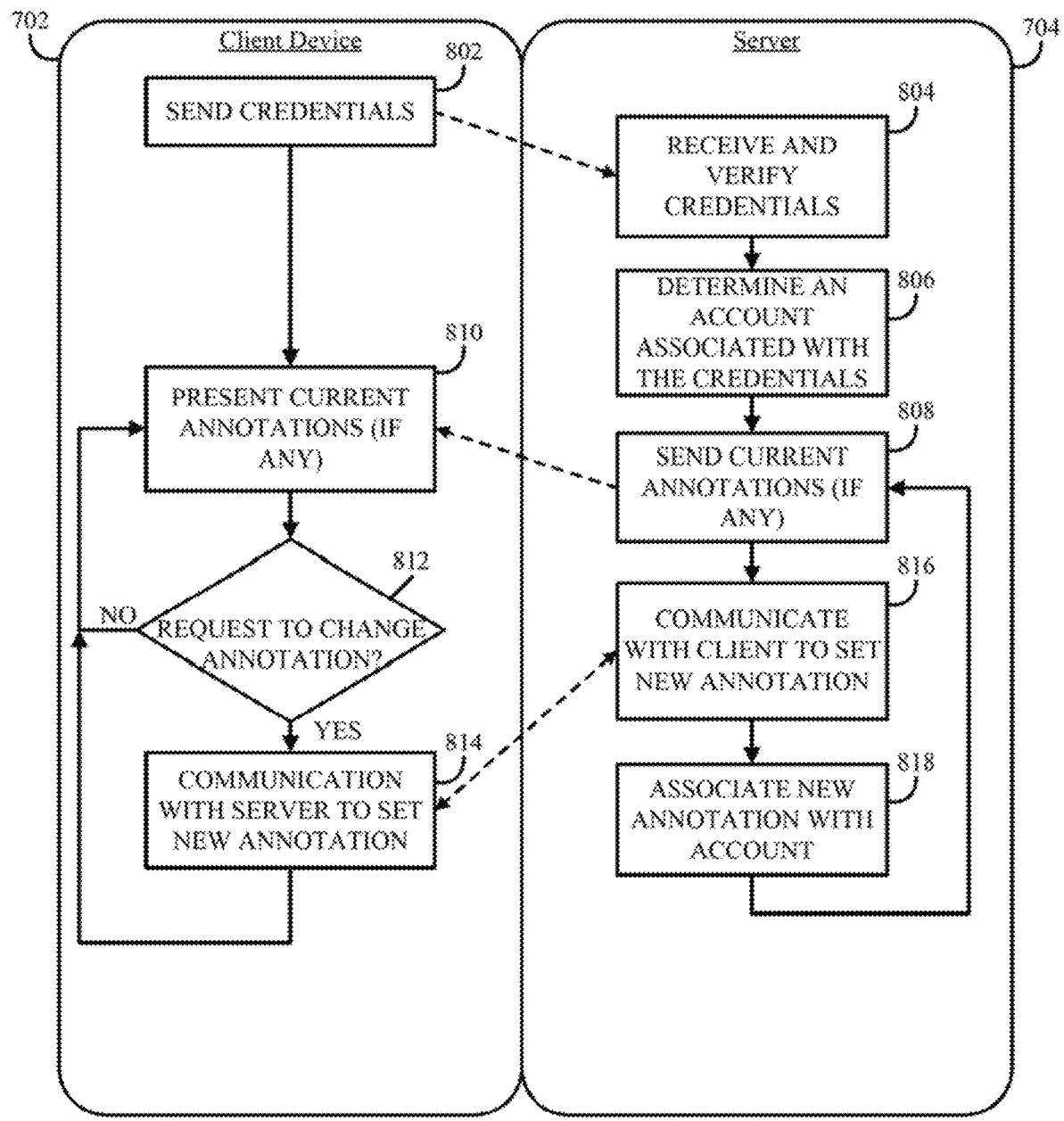
FIG. 8 shows a diagram illustrating a data flow for selecting and/or changing an annotation in accordance with some implementations of the disclosed subject matter.

FIG. 8 shows an example 800 of a flow diagram for selecting and/or changing an annotation in accordance with some implementations of the disclosed subject matter. Flow 800 can, for example, be representative of communications that take place during the processes associated with FIGS. 1 and 2 in some implementations. At 802, client 702 can send credentials to server 704. The credentials can be in any suitable form and can be transmitted using any suitable technique(s) as described above in connection with FIG. 1.

At 804, server 704 can receive and verify the credentials, for example, as described above in connection with FIG. 1. At 806, server 704 can determine an account associated with the credentials and retrieve any annotations currently associated with the account. For example, server 704 can determine whether any video or branding annotations are currently associated with the user account.

At 808, server 704 can send the retrieved annotations (if any were associated with the user account) to client 702. For example, the retrieved annotations can be sent as part of a user interface for selecting and/or changing an annotation. In a more particular example, the retrieved annotations can be sent to client 702 to be presented in a user interface such as the user interface described in connection with FIGS. 4, 6A and 6B. If there are no annotations associated with the user account, a user interface showing that no annotations are currently associated with the user account, such as user interface 300 described in connection with FIG. 3 can be presented to the user.

At 810, client 702 can present the annotations sent from server 704 at 808. For example, the current annotations can be presented as part of a user interface, such as the user interface described in connection with FIGS. 4, 6A and 6B.

At 812, client 702 can detect whether the user has requested a change in the presented annotation. For example, if the current annotations are presented using a user interface such as the user interface described in connection with FIGS. 3, 4, 6A and 6B, the client can determine whether the user has made any changes by, for example, selecting any of user interface elements 310, 312, 408, 410 or 420, or making a change to one of user interface elements 412, 414, 608 or 652.

If client 702 does not detect that the user requested a change to the annotation(s) ("NO" at 812), the client can return to 810 and continue to present the current annotation(s) at 810 and detect changes at 812. Otherwise, if client 702 detects that the user has requested a change to the annotation ("YES" at 812), client 702 can proceed to 814.

At 814, client 702 can communicate with server 704 to make any changes to the annotations requested by the user and when the annotation changes have been made client 702 can return to 810 to present the current annotations to the user.

At 816, server 704 can communicate with client 702 to make the changes to the annotations requested by the user, and when the annotation changes are made (e.g., when a user chooses to save the annotation by selecting 418, or chooses to remove the annotation by selecting 420) server 704 can proceed to 818 and associate the new annotation (e.g., newly added, changed, or removed annotation) with the account. When the new annotation(s) have been associated with the account, server 704 can return to 808 and send the newly associated annotation to client 702 for presentation to the user.

It should be noted that the annotations can be changed using any suitable technique(s). For example, client 702 can make changes to the annotation such as the placement of the annotation (e.g., selected using drop down list 412) or the display time (e.g., selected using drop down list 414) and then transmit the changes when the user selects to save the changed annotation (e.g., by selecting 418). As another example, client 702 can transmit instructions to server 704 indicating user actions (e.g., selection of user interface elements and the like) and server 704 can interpret the actions and return instructions for changing the user interface. Changes made to the annotations can then be saved when the user indicates that the changes should be saved (e.g., by selecting 418). It is understood that the user interface and the mechanisms described herein can be implemented using various techniques and the behavior of client 702 and server 704 can vary depending on the particular implementation.

Figure 9:
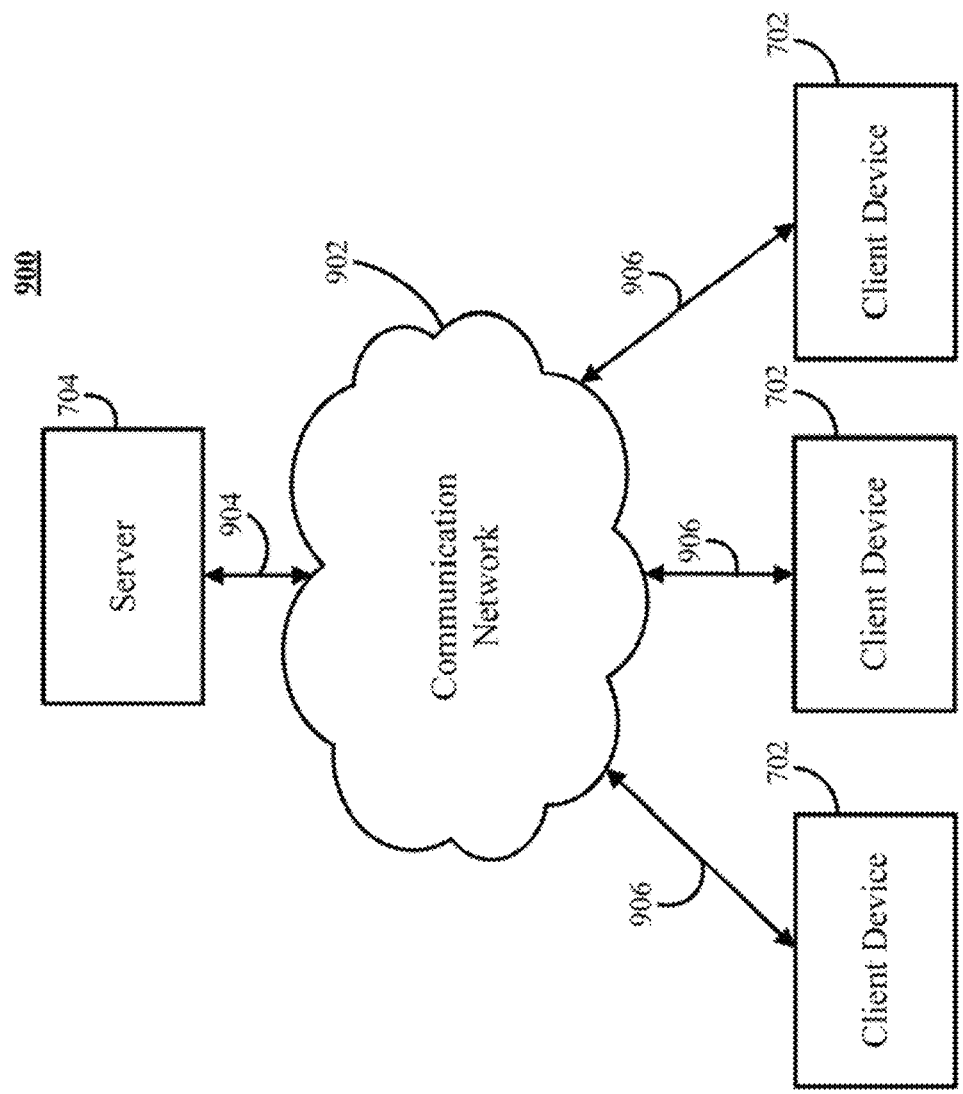
FIG. 9 shows a schematic diagram of an illustrative system suitable for implementation of mechanisms described herein for presenting annotations across multiple videos in accordance with some implementations of the disclosed subject matter.

FIG. 9 shows an example 900 of a generalized schematic diagram of a system on which the mechanisms for presenting annotations across multiple videos as described herein can be implemented in accordance with some implementations. As illustrated, system 900 can include one or more client devices 702. Client devices 702 can be local to each other or remote from each other. Client devices 702 can be connected by one or more communications links 906 to a communications network 902 that can be linked via a communications link 904 to server 704.

System 900 can include one or more servers 704. Server 704 can be any suitable server for providing access to the mechanisms described herein for presenting annotations across multiple videos, such as a processor, a computer, a data processing device, or any suitable combination of such devices. For example, the mechanisms for presenting annotations across multiple videos can be distributed into multiple backend components and multiple frontend components and/or interfaces. In a more particular example, backend components, such as data collection and data distribution can be performed on one or more servers 704. In another particular example, frontend components, such as a user interface, data entry, annotation presentation, video rendering, etc., can be performed on one or more client devices 702.

In some implementations, each of the client devices 702 and server 704 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, client device 702 can be implemented as a personal computer, a laptop computer, a digital media receiver, a smartphone, a tablet computer, a mobile telephone, a wearable computer, a personal data assistant (PDA), a set-top box, a smart television, a home entertainment system, a game console, any other suitable computing device, or any suitable combination thereof.

Communications network 902 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 904 and 906 can be any communications links suitable for communicating data among client devices 702 and server 704, such as network links, dial-up links, wireless links, hard-wired links, any other suitable communications links, or any suitable combination of such links. Client devices 702 can enable use of any of the techniques described herein that can allow the features of the mechanisms to be used. Client devices 702 and server 704 can be located at any suitable location.

Figure 10:
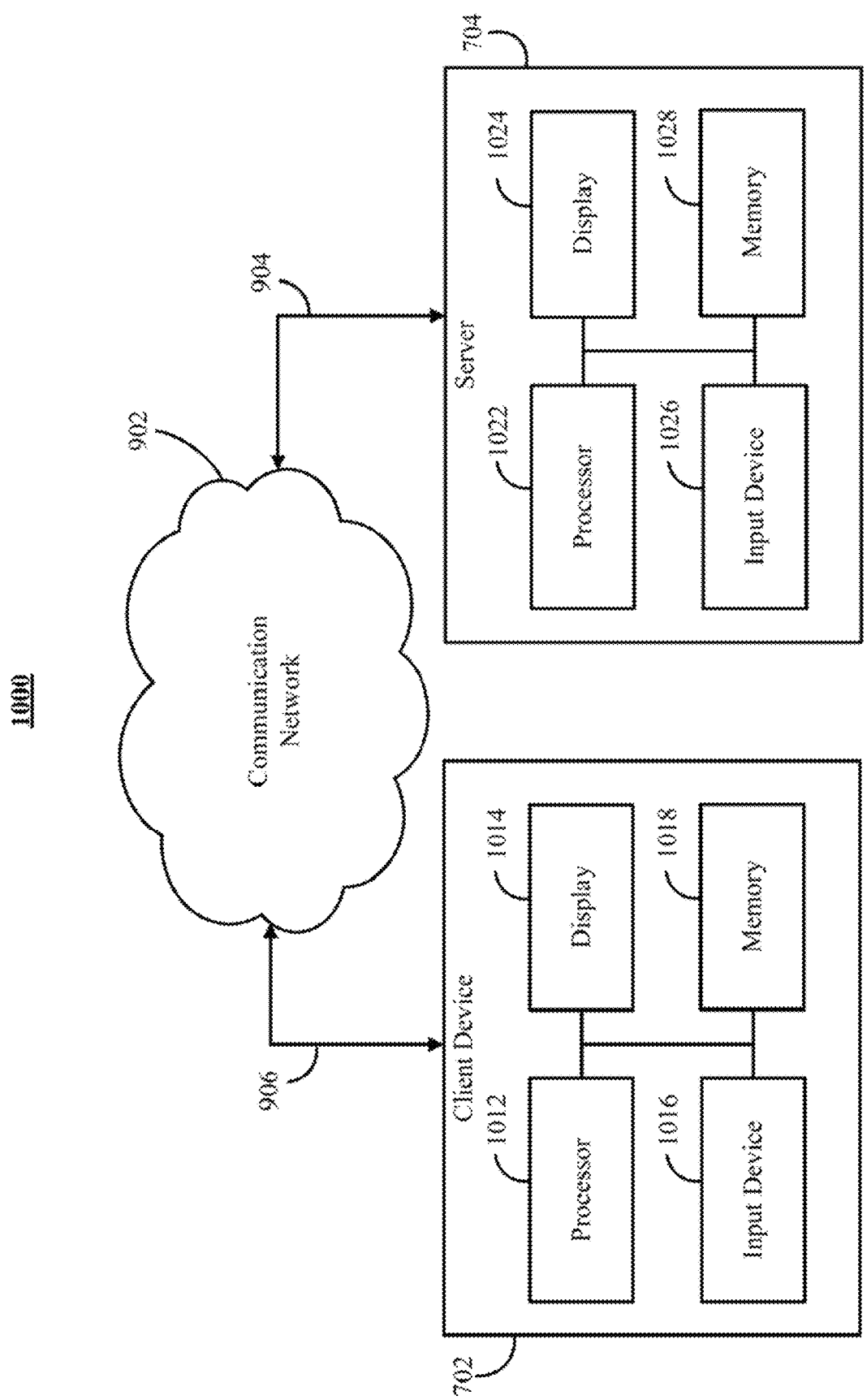
FIG. 10 shows a detailed example of a server and one of the client devices of FIG. 9 that can be used in accordance with some implementations of the disclosed subject matter.

FIG. 10 illustrates an example 1000 of hardware that can be used to implement server 704 and one of client devices 702 depicted in FIG. 9 in accordance with some implementations of the disclosed subject matter. Referring to FIG. 10, client device 702 can include a hardware processor 1012, a display 1014, an input device 1016, and memory 1018, which can be interconnected. In some implementations, memory 1018 can include a storage device (such as a non-transitory computer-readable medium) for storing a computer program for controlling hardware processor 1012.

Hardware processor 1012 can use the computer program to present on display 1014 content and/or an interface that allows a user to interact with the mechanisms described herein for presenting annotations in association with videos rendered by a device, such as client 702, and to send and receive data through communications link 906. It should also be noted that data received through communications link 906 or any other communications links can be received from any suitable source. In some implementations, hardware processor 1012 can send and receive data through communications link 906 or any other communication links using, for example, a transmitter, receiver, transmitter/receiver, transceiver, or any other suitable communication device. Input device 1016 can be a computer keyboard, a computer mouse, a touchpad, a voice recognition circuit, a touchscreen, and/or any other suitable input device.

Server 704 can include a hardware processor 1022, a display 1024, an input device 1026, and memory 1028, which can be interconnected. In some implementations, memory 1028 can include a storage device for storing data received through communications link 904 or through other links. The storage device can further include a server program for controlling hardware processor 1022.

Hardware processor 1022 can use the server program to communicate with clients 702 as well as provide access to and/or copies of the mechanisms described herein. It should also be noted that data received through communications link 904 or any other communications links can be received from any suitable source. In some implementations, hardware processor 1022 can send and receive data through communications link 904 or any other communication links using, for example, a transmitter, receiver, transmitter/receiver, transceiver, or any other suitable communication device. In some implementations, hardware processor 1022 can receive commands and/or values transmitted by one or more users. Input device 1026 can be a computer keyboard, a computer mouse, a touchpad, a voice recognition circuit, a touchscreen, and/or any other suitable input device.

In some implementations, server 704 can be implemented in one server or can be distributed as any suitable number of servers. For example, multiple servers 704 can be implemented in various locations to increase reliability and/or increase the speed at which the server can communicate with client devices 702.

In some implementations, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the user input interface application. For instance, these mechanisms can encompass a computer program written in a programming language recognizable by client device 702 and/or server 704 that is executing the mechanisms (e.g., a program written in a programming language, such as, Java, C, Objective-C, C++, C #, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1, 2, 7 and 8 can be executed or performed in any order or sequence not limited to the order and sequence shown and described in the figures. Also, some of the above steps of the processes of FIGS. 1, 2, 7 and 8 can be executed or performed substantially simultaneously where appropriate or in parallel to reduce latency and processing times. Furthermore, it should be noted that FIGS. 1, 2, 7 and 8 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for presenting annotation across multiple videos are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed:
1. A method for presenting annotations across multiple videos, the method comprising:
receiving a selection of a subset of videos from a plurality of videos for annotation and an indication to place the annotation in a plurality of videos associated with a user account in which the subset of videos is associated, wherein the subset of videos includes a first video and a second video;

in response to receiving the selection of the subset of videos for annotation and the indication to place the annotation in the plurality of videos associated with the user account, identifying, using a hardware processor, the user account associated with the subset of videos and identifying the plurality of videos associated with the user account;

causing an annotation interface for configuring a first annotation in the plurality of videos to be presented, wherein the annotation interface includes a position selection within each video in the plurality of videos for placing the first annotation, a display time selection for the first annotation to begin being presented within each video in the plurality of videos, and a time duration selection for the first annotation to be presented within each video in the plurality of videos, wherein the position selection, the display time selection, the duration of time selection associated with the first annotation are to be applied to each video in the plurality of videos; and in response to receiving user inputs in the annotation interface that configure the position selection, the display time selection, and the duration of time selection associated with the first annotation, associating the first annotation with the first video, associating the first annotation with the second video, and associating the first annotation with each of the plurality of videos, wherein the first video, the second video, and the plurality of videos are associated with the user account.

2. The method of claim 1, further comprising inhibiting presentation of the first annotation during playback of videos associated with the user account that are not included in the subset of videos.

3. The method of claim 1, further comprising:
specifying a second annotation to be associated with the subset of videos;
associating the second annotation with the first video of the subset of videos and associating the second annotation with the second video of the subset of videos; and
causing the second annotation to be presented during playback of each of the subset of videos, including both the first video and the second video.

4. The method of claim 1, further comprising selecting a new annotation to replace the first annotation periodically based on a rule.

5. The method of claim 1, further comprising:
subsequent to associating the first annotation with the plurality of videos, determining that a new video has been associated with the user account; and
causing the first annotation to be presented during playback of the new video.

6. The method of claim 1, wherein the plurality of videos is all videos associated with the user account.

7. The method of claim 1, wherein the annotation interface includes a preview of the first annotation within the selected first video at a position corresponding to the position selection and at times corresponding to the display time selection and the time duration selection.

8. The method of claim 1, wherein the first annotation includes at least one of text, animation, an image, a hyperlink, and a video.

9. The method of claim 1, further comprising causing content associated with the first annotation to be presented in response to selection of the first annotation during playback of one of the plurality of videos.

10. A system for presenting annotations across multiple videos, the system comprising:
a hardware processor configured to:
receive a selection of a subset of videos from a plurality of videos for annotation and an indication to place the annotation in a plurality of videos associated with a user account in which the subset of videos is associated, wherein the subset of videos includes a first video and a second video;

in response to receiving the selection of the subset of videos for annotation and the indication to place the annotation in the plurality of videos associated with the user account, identify the user account associated with the subset of videos and identifying the plurality of videos associated with the user account;

cause an annotation interface for configuring a first annotation in the plurality of videos to be presented, wherein the annotation interface includes a position selection within each video in the plurality of videos for placing the first annotation, a display time selection for the first annotation to begin being presented within each video in the plurality of videos, and a time duration selection for the first annotation to be presented within each video in the plurality of videos, wherein the position selection, the display time selection, the duration of time selection associated with the first annotation are to be applied to each video in the plurality of videos; and in response to receiving user inputs in the annotation interface that configure the position selection, the display time selection, and the duration of time selection associated with the first annotation, associate the first annotation with the first video, associating the first annotation with the second video, and associating the first annotation with each of the plurality of videos, wherein the first video, the second video, and the plurality of videos are associated with the user account.

11. The system of claim 10, wherein the hardware processor is further configured to inhibit presentation of the first annotation during playback of videos associated with the user account that are not included in the subset of videos.

12. The system of claim 10, wherein the hardware processor is further configured to:
specify a second annotation to be associated with the subset of videos;
associate the second annotation with the first video of the subset of videos and associating the second annotation with the second video of the subset of videos; and
cause the second annotation to be presented during playback of each of the subset of videos, including both the first video and the second video.

13. The system of claim 10, wherein the hardware processor is further configured to select a new annotation to replace the first annotation periodically based on a rule.

14. The system of claim 10, further comprising:
subsequent to associating the first annotation with the plurality of videos, determine that a new video has been associated with the user account; and
cause the first annotation to be presented during playback of the new video.

15. The system of claim 10, wherein the plurality of videos is all videos associated with the user account.

16. The system of claim 10, wherein the annotation interface includes a preview of the first annotation within the selected first video at a position corresponding to the position selection and at times corresponding to the display time selection and the time duration selection.

17. The system of claim 10, wherein the first annotation includes at least one of text, animation, an image, a hyperlink, and a video.

18. The system of claim 10, wherein the hardware processor is further configured to cause content associated with the first annotation to be presented in response to selection of the first annotation during playback of one of the plurality of videos.

19. A non-transitory computer-readable medium containing computer executable instructions that, when executed by a processor, cause the processor to perform a method for presenting annotations across multiple videos, the method comprising:

receiving a selection of a subset of videos from a plurality of videos for annotation and an indication to place the annotation in a plurality of videos associated with a user account in which the subset of videos is associated, wherein the subset of videos includes a first video and a second video;

in response to receiving the selection of the subset of videos for annotation and the indication to place the annotation in the plurality of videos associated with the user account, identifying the user account associated with the subset of videos and identifying the plurality of videos associated with the user account;

causing an annotation interface for configuring a first annotation in the plurality of videos to be presented, wherein the annotation interface includes a position selection within each video in the plurality of videos for placing the first annotation, a display time selection for the first annotation to begin being presented within each video in the plurality of videos, and a time duration selection for the first annotation to be presented within each video in the plurality of videos, wherein the position selection, the display time selection, the duration of time selection associated with the first annotation are to be applied to each video in the plurality of videos; and in response to receiving user inputs in the annotation interface that configure the position selection, the display time selection, and the duration of time selection associated with the first annotation, associating the first annotation with the first video, associating the first annotation with the second video, and associating the first annotation with each of the plurality of videos, wherein the first video, the second video, and the plurality of videos are associated with the user account.

* * * * *